United States Patent
Kota et al.

(10) Patent No.: US 10,263,884 B2
(45) Date of Patent: Apr. 16, 2019

(54) COORDINATED CONTENT DISTRIBUTION OVER NETWORK

(71) Applicant: VMware, Inc., Palo Alto, CA (US)

(72) Inventors: Preeti Kota, Sunnyvale, CA (US); Oleg Zaydman, San Jose, CA (US); Yanping Cao, San Carlos, CA (US); Pratik Kapadia, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 115 days.

(21) Appl. No.: 15/449,927

(22) Filed: Mar. 4, 2017

(65) Prior Publication Data
US 2018/0254977 A1 Sep. 6, 2018

(51) Int. Cl.
*H04L 12/761* (2013.01)
*H04L 12/753* (2013.01)

(52) U.S. Cl.
CPC .............. *H04L 45/16* (2013.01); *H04L 45/48* (2013.01)

(58) Field of Classification Search
None
See application file for complete search history.

(56) References Cited

U.S. PATENT DOCUMENTS

| | | | |
|---|---|---|---|
| 7,013,330 B1* | 3/2006 | Tarbotton ............ | H04L 12/1863 709/203 |
| 7,356,712 B2* | 4/2008 | Chen .................... | H04L 63/101 713/150 |
| 8,311,382 B1 | 11/2012 | Harwell et al. | |
| 8,407,200 B2 | 3/2013 | Wable et al. | |
| 8,452,779 B1 | 5/2013 | Kelley et al. | |
| 9,729,581 B1* | 8/2017 | Skene ..................... | H04L 63/20 |
| 2004/0218536 A1* | 11/2004 | Yasukawa ........... | H04L 12/1877 370/238 |
| 2005/0038909 A1* | 2/2005 | Yoshiba .............. | H04L 12/1886 709/241 |
| 2009/0081944 A1* | 3/2009 | Yavuz .................. | H04L 12/1881 455/3.01 |
| 2011/0314516 A1 | 12/2011 | Li et al. | |
| 2013/0006980 A1 | 1/2013 | Frumin | |
| 2013/0347047 A1* | 12/2013 | Tanaka ................. | H04N 21/654 725/110 |
| 2014/0286165 A1* | 9/2014 | Chowdhury .......... | H04W 4/029 370/235 |
| 2016/0239281 A1* | 8/2016 | Avisror ..................... | G06F 8/61 |
| 2017/0323194 A1* | 11/2017 | Wang ..................... | G06N 5/003 |
| 2017/0346922 A1* | 11/2017 | Sonoda ................... | H04L 67/32 |
| 2018/0176914 A1* | 6/2018 | Hagihara ................. | H04B 7/14 |

* cited by examiner

*Primary Examiner* — George C Atkins
(74) *Attorney, Agent, or Firm* — Clifton Leon Anderson

(57) ABSTRACT

A coordinated multi-cast content distribution process is used to distribute content, e.g., files, from a source node of a network to target nodes of the network. A minimum spanning tree is identified for the network based on costs of edges connecting the nodes. The minimum spanning tree includes the source node and all target nodes; the minimum spanning tree distinguishes leaf target nodes from non-leaf target nodes. Content parts are moved along the spanning tree in an iterative process in which, for each iteration, the highest-cost leaf nodes are identified and content parts are moved toward the identified leaf nodes. This process reduces avoids network congestion and reduces the total bandwidth consumption required to supply the content to all target nodes.

21 Claims, 16 Drawing Sheets

COORDINATED CONTENT DISTRIBUTION OVER NETWORK

BACKGROUND

Virtual machines, that is, programs that emulate physical computers, can be stored, along with guest operating systems and programs running on the guest operating system, as virtual-machine images. Virtual machine images are files and, as such, can be stored, replicated, and transferred. Thus, when a virtual machine has been successfully created or updated, instances of it can be distributed, e.g., to other physical hosts. For example, a new or updated virtual machine can be replicated, and the copies can be distributed to geographically separate data centers to provide better access for geographically distributed users.

DETAILED DESCRIPTION

In a scenario in which a large file is to be "published" by a source node and distributed to plural target nodes, network bandwidth can be strained. Where the transfers directed toward respective target nodes are handled independently, traffic congestion can result and impair performance. The present invention provides for coordinating the transfers to respective target nodes to reduce or minimize network congestion.

More specifically, target nodes can be ranked in terms of the respective costs (e.g., transfer times) required to send them the content. Content can be preferentially sent to higher-cost target nodes. As content parts are transferred toward and to a target node, its associated cost is reduced. The transfer costs can be recalculated, so that the rankings of the nodes can change until all targets have received all parts of the content. This prioritization of target nodes by cost helps minimize the total time required for the multicast.

Furthermore, the invention provides for coordinating transfers in a way that can reduce the total amount of bandwidth collectively consumed by the transfers. For example, some target nodes can be identified as "repeater nodes", i.e., nodes that are to "republish" received content so that the content can be forwarded to other target nodes. Where a target node is "closer" to a repeater node than it is to the source node, the use of the repeater node can result in a reduction in the total bandwidth consumed by the multi-cast transfer.

Figure 1:
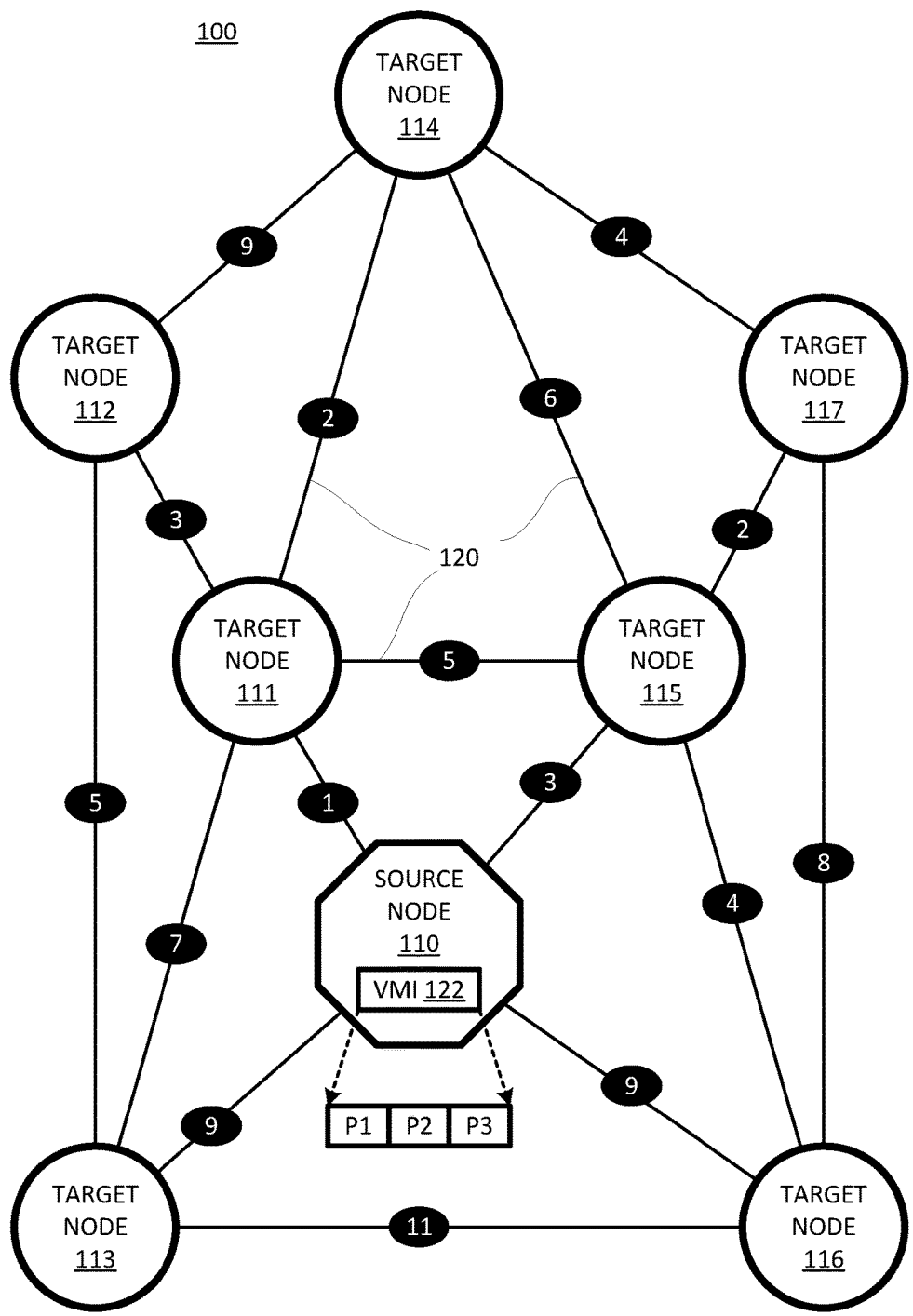
FIG. 1 is a schematic view of a coordinated content distribution network.

As shown in FIG. 1, a content distribution network 100 includes processing nodes, including a source node 110 and target nodes 111-117. Edges 120 connect respective pairs of nodes; FIG. 1 includes indications for cost (transit time) for each edge. For example, the cost for the edge connecting source node 110 to target node 113 is 9 units. On the other hand, the cost associated with the edge connecting source node 110 to target node 111 plus the cost of the target node 111 to target node 113 is 1+7=8. Thus, there will be a cost savings of a unit if content is sent from source node 110 to target node 113 via target node 111 rather than directly. To limit peak bandwidth, content in the form of a virtual-machine image (VMI) file 122 is divided into parts P1, P2, P3, which are to be transferred one part at a time. In practice, a large file may be divided into many more than three parts.

Figure 2:
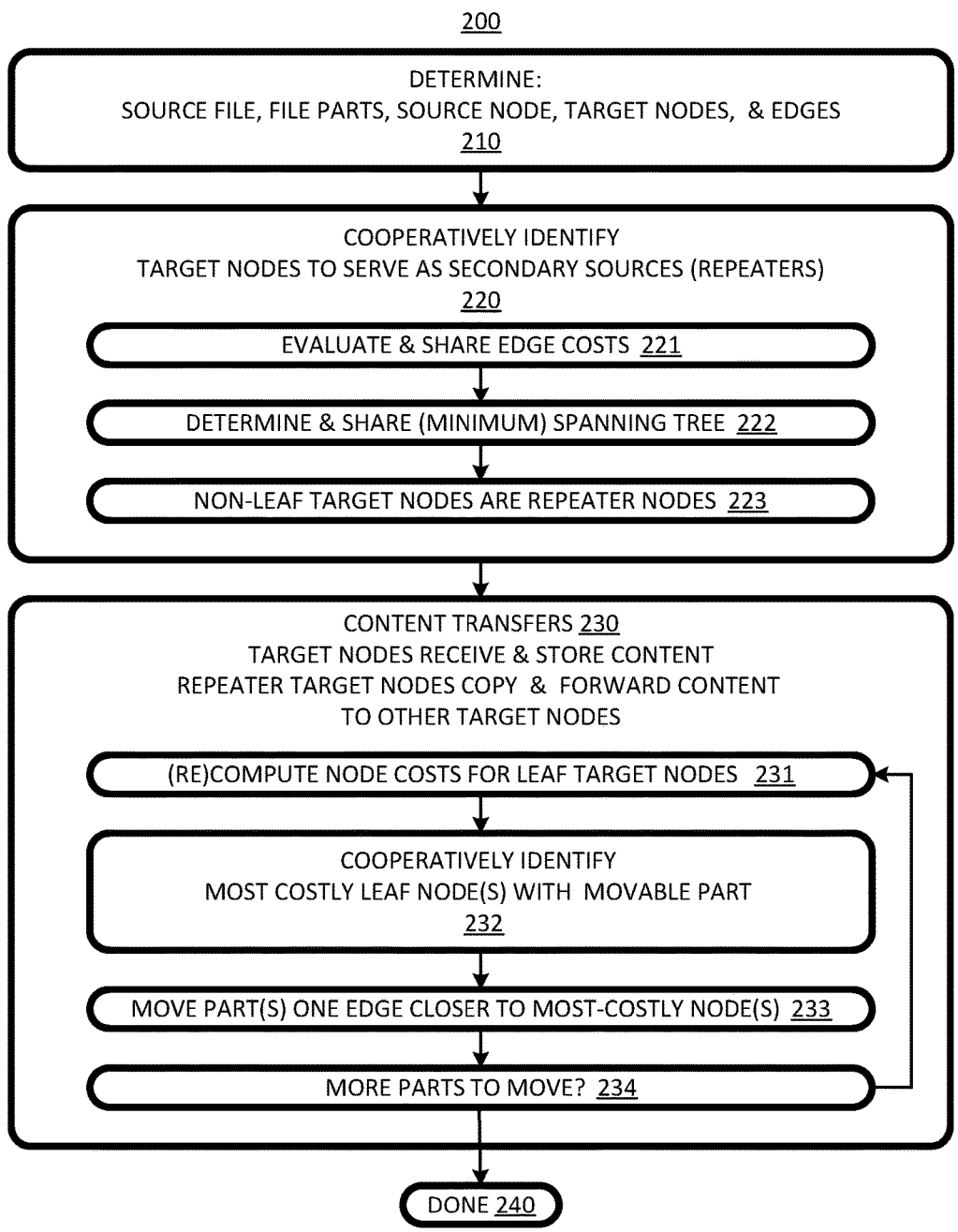
FIG. 2 is a flow chart of a coordinated content distribution process that can be used in the coordinated content distribution network of FIG. 1 and in other networks.

A multicast content distribution process 200, flow charted in FIG. 2 can be implemented on network 100 and on other networks. At 210, the source node, the file on the source node to be transferred, the target nodes, and the edges linking the nodes are identified. In addition, the file can be divided into parts to be transferred atomistically; thus 210 can include identifying these parts. At 220, a subset of the target nodes is selected to serve as repeater target nodes, i.e., secondary sources that can replicate content and forward it to other target nodes. At 230, the content parts are moved to the target nodes; repeater nodes receive content, store the content, replicate content, and forward content to other target nodes. Once all target nodes have received all parts of the content, process 200 is done at 240.

Figure 3:
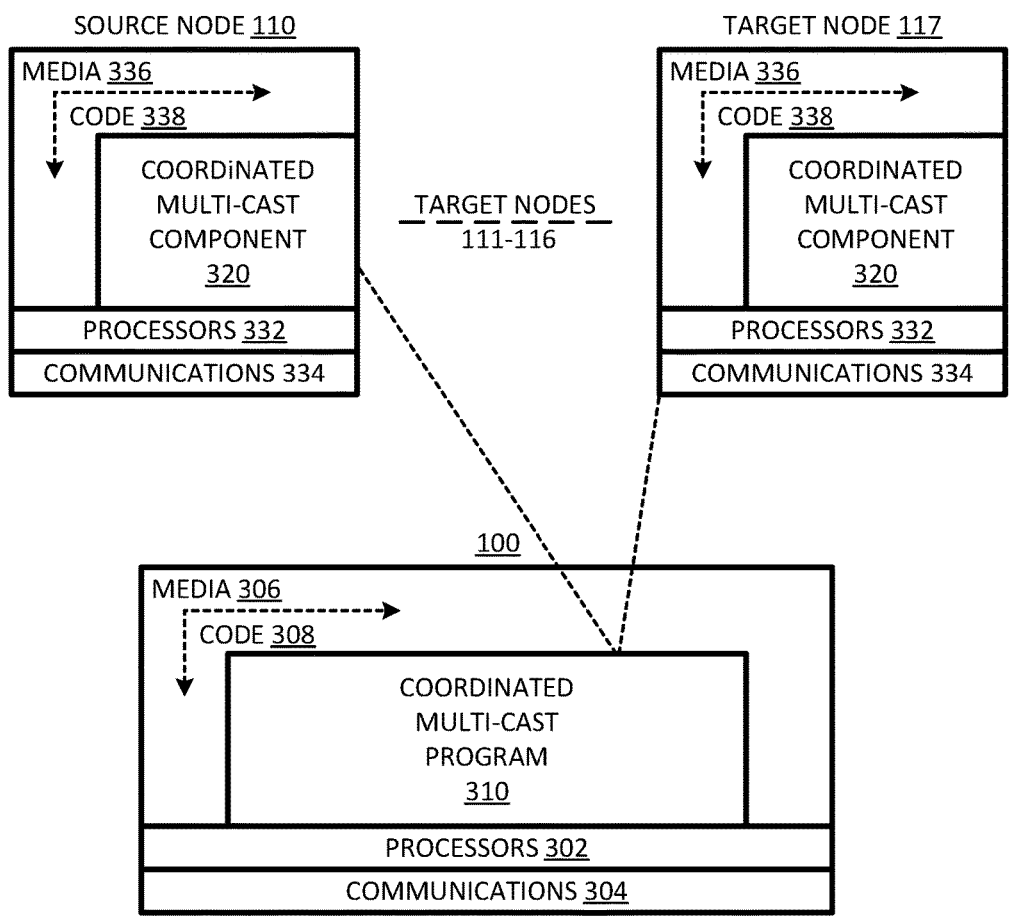
FIG. 3 are schematic hardware views of the coordinated content distribution network of FIG. 1.

Process 200 can be implemented as code representing a program of instructions to be executed by hardware. As shown in FIG. 3, content distribution network 100 includes hardware, namely, processors 302, communications devices 304, and non-transitory media 306. Media 306 is encoded with code 308 representing a cooperative multi-cast program 310. When executed using processors 302, program 310 implements process 200.

Program 310 comprises coordinated multi-cast components, e.g., components 320, which reside and execute on source node 110 and target node 117. Other target nodes host other respective components of program 310. Source node 110 and target nods 111-116 (FIG. 1) each includes processors 342, communications devices 344, non-transitory media 346. For each media 346, code thereon represents a component of program 320. The components interact to implement process 200 cooperatively. The cooperative nature of process 200 is explained further with reference to FIG. 2.

As described above, process 200 includes cooperatively identifying, at 220, target nodes to serve as secondary sources, e.g., as "repeaters". This identifying includes evaluating and sharing (information regarding) edge costs at 221. For example, each pair of nodes linked by an edge in FIG. 1 can cooperate with each other to determine the transit time for transfers along the edge. The nodes can then consolidate the costs so that each node can know the costs of all edges in network 100.

Figure 4:
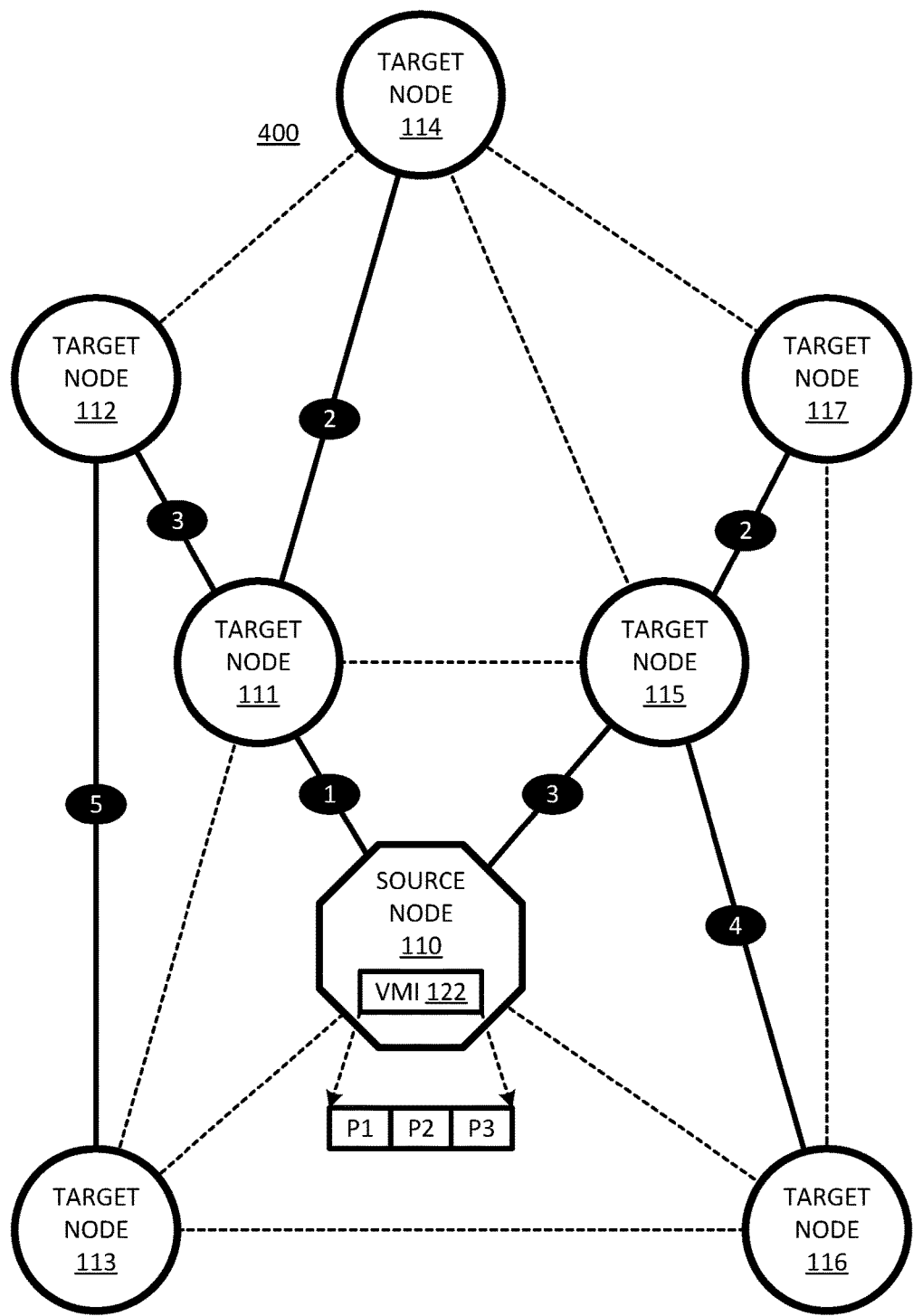
FIGS. 4-16 are graphs of the coordinated content distribution network of FIG. 1 at respective different stages in the execution of the process of FIG. 2. Such graphs can be used to plan and schedule distribution of content parts to target nodes.

At 220, an arbitrarily selected node determines a spanning tree, which is a subnetwork of network that includes all nodes, but only a subset of the edges sufficient for all nodes to be connected. Such a spanning tree 400 is shown in FIG. 4, with the omitted edges shown in dash. Spanning tree 400 includes source node 110 and target nodes 111-117. The costs determined at 221 for the retained edges are shown in FIG. 4. Spanning tree 400 is a "minimum" spanning tree in that the sum total of the edge costs is the minimum for all possible spanning trees for the illustrated source and target nodes. A minimum spanning tree is selected to minimize total bandwidth consumption associated with the delivery of content.

Figure 5:
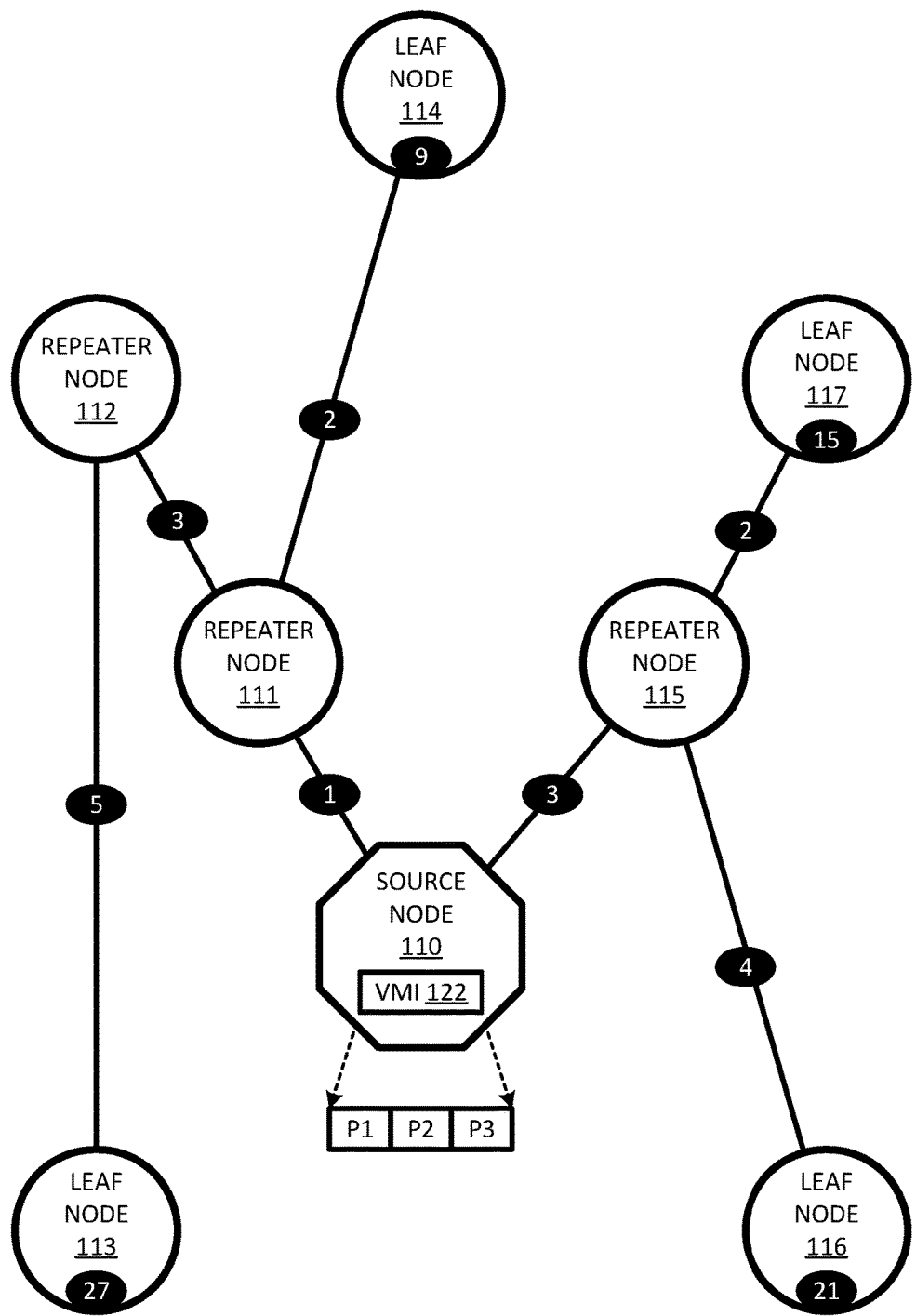

An arbitrarily selected node can then identify those target nodes connected to only one edge, e.g., nodes 113, 114, 116, and 117; these are "leaf nodes", as indicated in FIG. 5. Since the one edge is going to be used to receive content, the leaf target nodes are not in positions to forward content to other nodes. However, the non-leaf target nodes 111, 112, and 115 can receive content on one link and forward the content on one or more other links. Thus, the non-leaf target nodes are repeater-target nodes.

As described above, at 230, target nodes receive and store content. Repeater-target nodes also copy (replicate) content and forward content (either the instance received or the replica) to another target node, which may be a repeater or a leaf node. The nodes collectively determine the order in which content parts are moved using an iterative procedure. For the first iteration, the nodes cooperate to compute the costs for the leaf nodes at 231. Each leaf node is at the end of a path that begins at the source node. The product of the number of parts to be moved times the sum of the costs associated with the edges in that path is the initial cost for that leaf node. The sums are shown in FIG. 5; the initial costs of leaf nodes 113, 114, 116, and 117 are 27, 9, 21, and 15, respectively. For example, leaf node 113 is at the end of a path from source node 110 that includes edges of costs 1, 3, and 5. The sum of the costs is 9, and there are three parts to VMI 122, so the cost for leaf node 113 is 9*3=27.

At 232, the leaf nodes are ranked. To this end, the nodes cooperate to determine the most costly leaf node, which, in the initial iteration is node 113 with a cost of 27. At 233, the nodes cooperate to determine which content part to move toward the most costly leaf node. This allows distribution to nodes to be scheduled based on rank. Since the choice of which node to send a part towards depends on the relative costs associated with the leaf nodes, process 200 is "coordinated".

Figure 6:
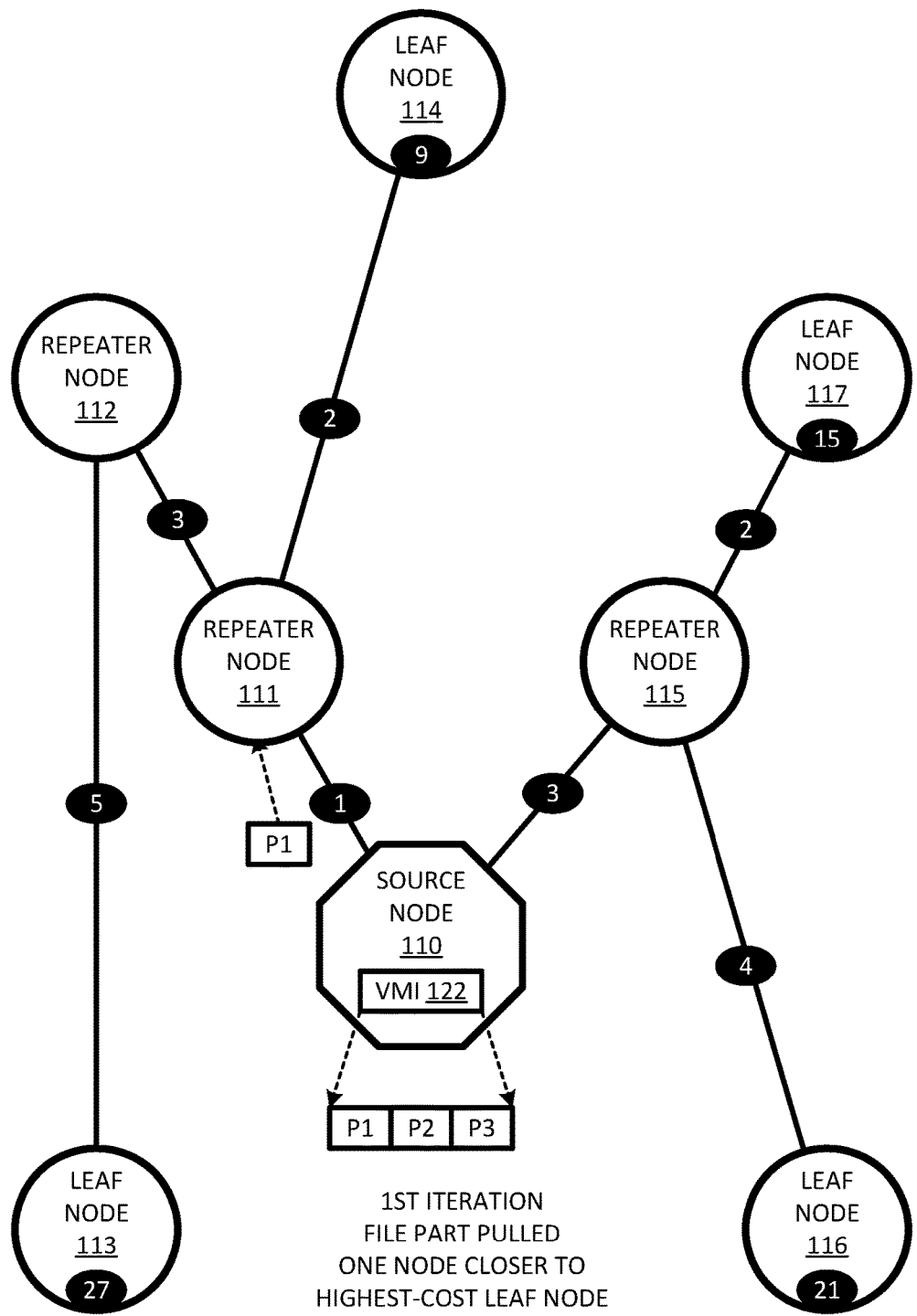

Since leaf node 113 has the highest cost, one of the content parts on source node 110 is moved toward leaf node 113. Selecting part P1 arbitrarily, it is moved from source node 110 to leaf node 111 (as indicated in FIG. 6) which is one node closer along the path from source node 110 to leaf node 113. In view of the processing load involved in sending and receiving content parts, content transfer 230 imposes a constraint that no node can be involved in more than one transfer at a time. Since source node 110 is involved in this first transfer and since all other potential transfers from the illustrated state would involve source node 110, no other transfers are made in the first iteration. At 234, the nodes determine that there are more parts to move before the desired multicast is complete; accordingly another iteration of action 230 is performed.

In view of the move of part P1 from source node 110, which consumed 1 bandwidth consumption unit, the forward-looking costs for leaf nodes 113 and 114 are decreased by 1 each: the cost of leaf node 113 decreases from 27 to 26; and the cost of leaf node 114 decreases from 9 to 8. Thus, the node ranking re dynamically adjusted iteration-to-iteration. The costs of leaf nodes 116 and 117 are unaffected. Since source node 110 is involved in the transfer to repeater node 111, it is precluded from participating in another transfer. Thus, no other parts can be transferred in this first iteration. The results of the first iteration are depicted in FIG. 7.

Figure 7:
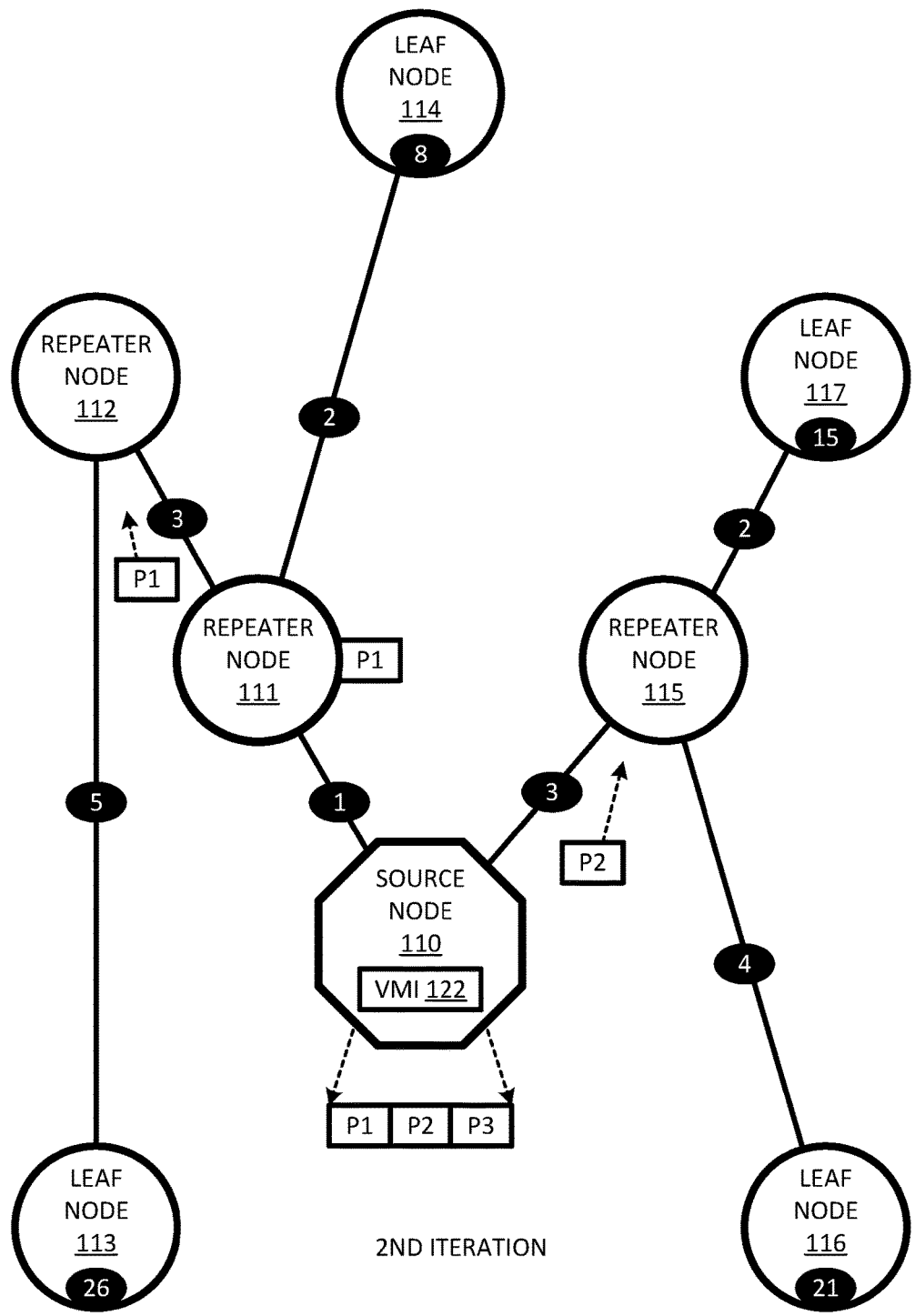

A second iteration of action 230 (FIG. 2), forwarding content, is described with respect to FIG. 7. Leaf node 113 remains the highest-cost leaf node with a cost of 26. Accordingly, it pulls a part one node closer. In the illustrated embodiment, the part closest to the leaf node that is doing the pulling is moved rather than a part that is closer to source node 110. This has the advantage of freeing the source node and target nodes close to the source for additional transfers.

In an alternative embodiment, other parts are pulled, e.g., part P2 can be transferred from source node 119 to repeater node 111. Leaf node 113 cannot pull any other parts as repeater node 111 is involved in the transfer of part P1 to repeater node 112.

Leaf node 116 is the next highest cost leaf node. Leaf node 116 can pull a part from source node 110, which is not involved in the transfer toward leaf node 113. Note that this secondary move would not have been available if leaf node 113 had pulled part P2 or part P3 from source node 110 instead of part P1 from repeater node 111. In the illustrated case, part P2 is pulled from source node 110 to repeater node 115. An advantage of pulling a part different from the part pulled by leaf node 113 is that instances of more parts are available outside the source node; this offers some backup in the case the source node fails. The advantage is more fully realized after a subsequent iteration when part P3 is also transferred from source node 110. In an alternative case, another part, e.g., part P1 is pulled. There are no other moves available (that do not involve a node that is already busy transferring a part), so this completes the second iteration.

Figure 8:
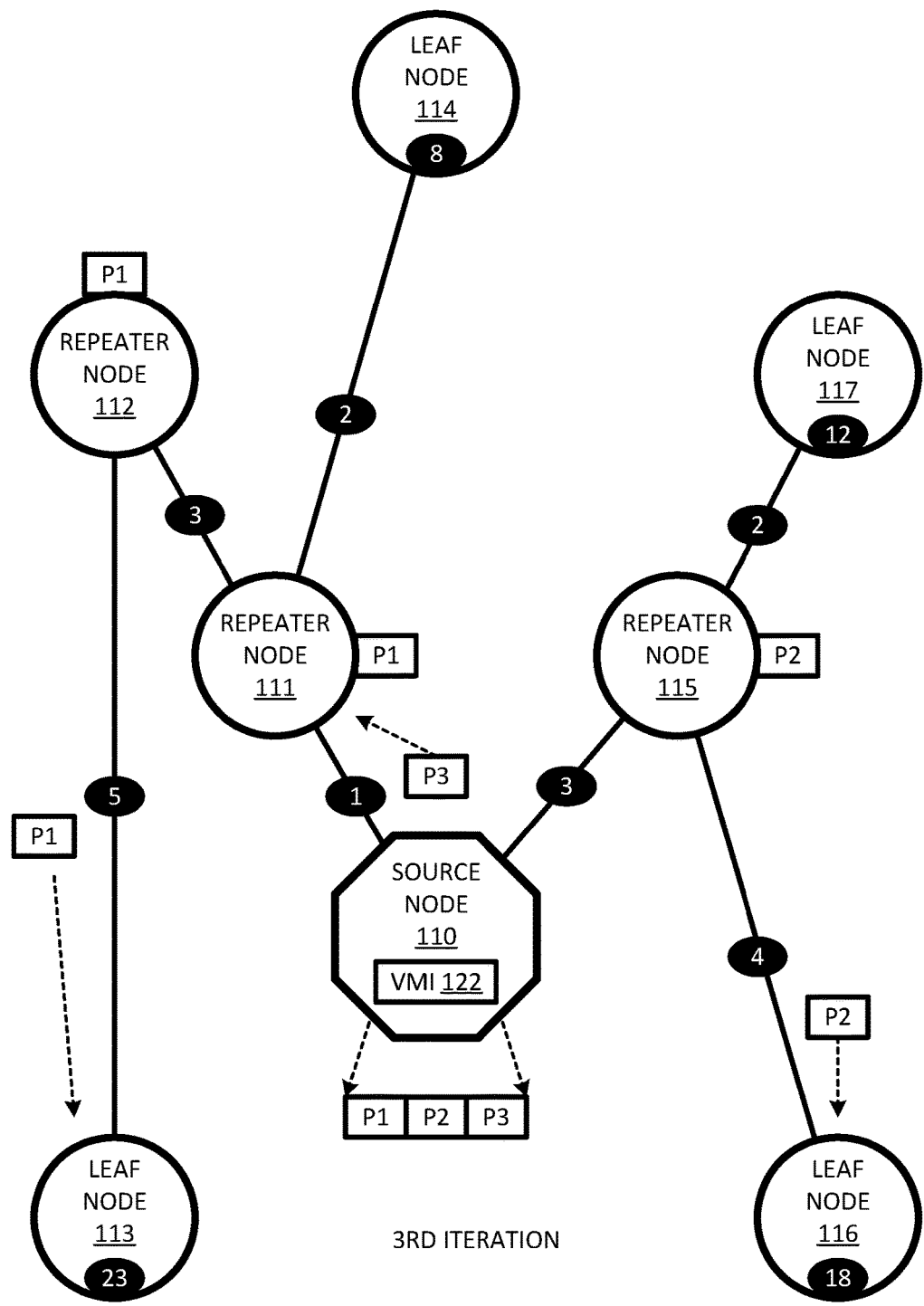

Note that the move from repeater node 111 to repeater node 112 decreases the cost of leaf node 113 by 3 from 26 to 23. The move from source node 110 to repeater node 115 decreases by 3 the cost of leaf node 116 from 21 to 18, and the cost of leaf node 117 from 15 to 12. These results are shown in FIG. 8.

A third iteration of content transfers 230 is described with reference to FIG. 8. The cost of leaf node 113 is the highest at 23. Accordingly, it pulls a content part toward itself. In this case, part P1, which is closest to leaf node 113, is pulled from repeater node 112 to leaf node 113. Content transfer 230 permits leaf node 113 to pull a second part since, even after the 5 units associated with the transfer from repeater node 112 to leaf node 113 are deducted from the cost of leaf node 113, it remains (tied for) the highest-cost leaf node. Otherwise, leaf node 116 would have priority for the next transfer. So part P3 (selected to ensure all three parts have copies off the source node in case of a source node failure) can be transferred from source node 110 to repeater node 111. In an alternative embodiment, no leaf node is allowed to pull more than one part per iteration.

Figure 9:
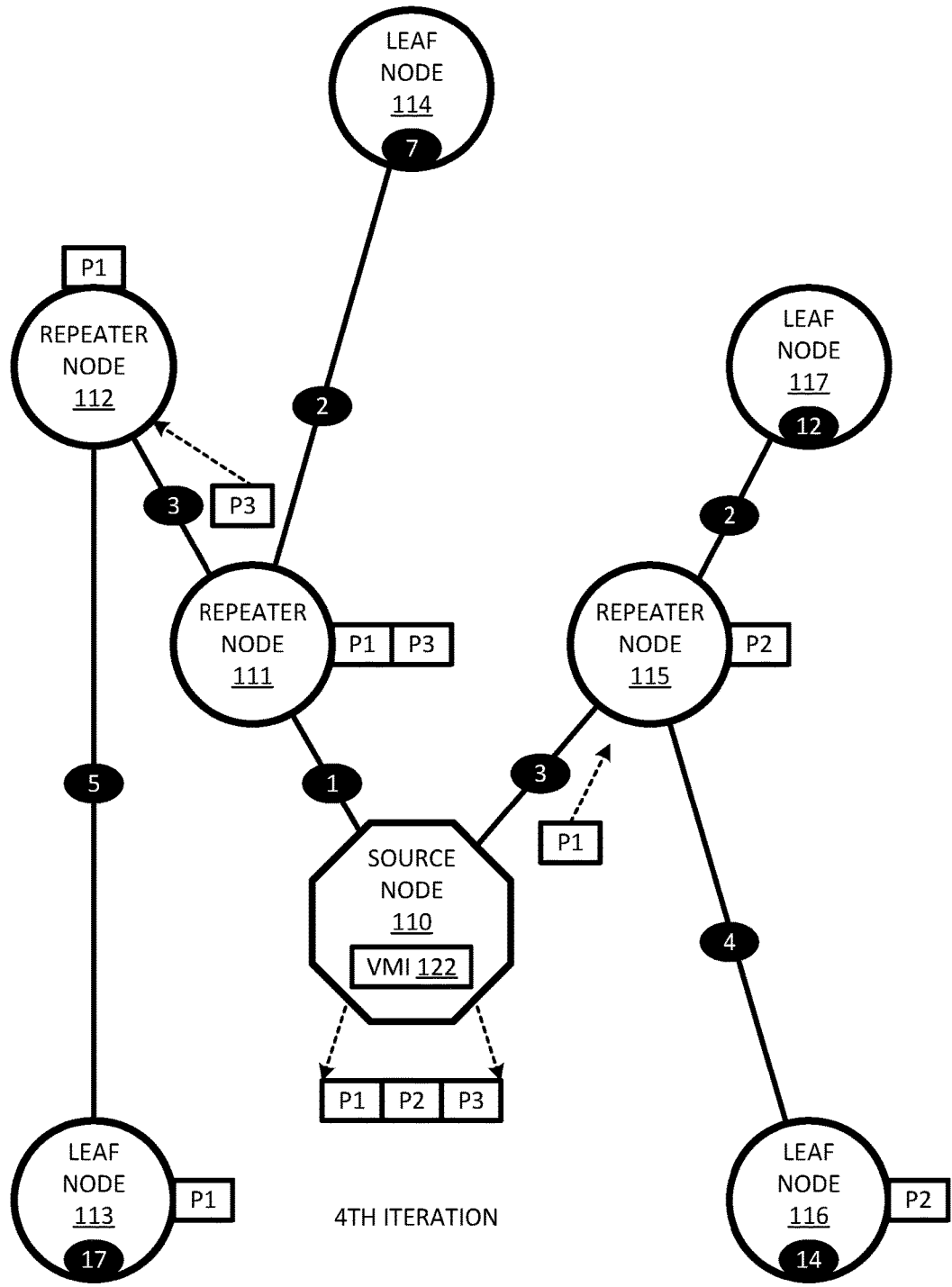

Leaf node 116 has the second highest cost at 18, so it can pull part P2 from repeater node 115 to itself. No additional move is available. However, in an embodiment in which no node can pull more than one part per iteration, part P2 would not have been pulled by leaf node 113. However, in that case, leaf node 114 could pull part P1 to itself. Given the transfers as indicated in FIG. 8, the cost of leaf node 113 is to be reduced by 5+1=6 from 23 to 17. The cost of leaf node 114 is to be reduced by 1 from 8 to 7. The cost of leaf node 116 is to be reduced by 4 from 18 to 14. These results are shown in FIG. 9.

In the illustrated embodiment, each iteration is allowed to complete before the next iteration. In other words, content transfer 230 is synchronous. In an alternative embodiment, content transfer is asynchronous. Thus, since, referring to FIG. 8, the transfer of part P3 from source node 110 can finish before the transfer of part P1, it would be possible to transfer part P1 from repeater node 111 to leaf node 114 or part P2 from source node 110 to repeater node 111.

Figure 10:
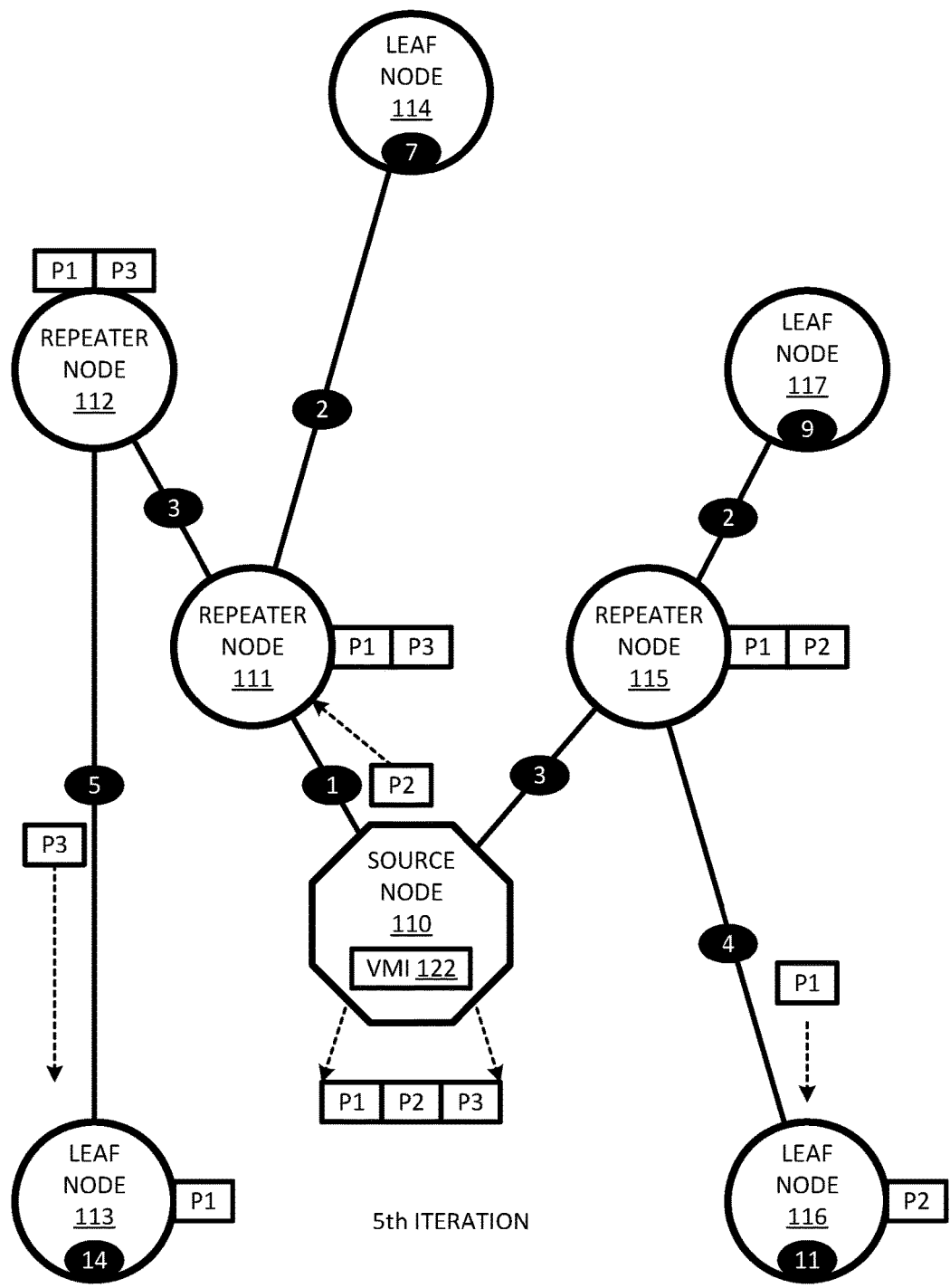

The fourth iteration is described with reference to FIG. 9. Leaf node 113 remains the highest cost leaf node with a cost of 17. Accordingly, it pulls part P3 from repeater node 111 to repeater node 112. Upon completion, this transfer reduces the cost of leaf node 113 by 3 from 17 to 14. Other than leaf node 113, leaf node 116 has the highest cost node with a cost of 14. Accordingly, it pulls part P1 from source node 110 to repeater node 115. Upon completion of this transfer, the cost of leaf node 116 is reduced by 3 from 14 to 11. Also, the cost of leaf node 117 is reduced by 3 from 12 to 9. These results are indicated in FIG. 10.

Figure 11:
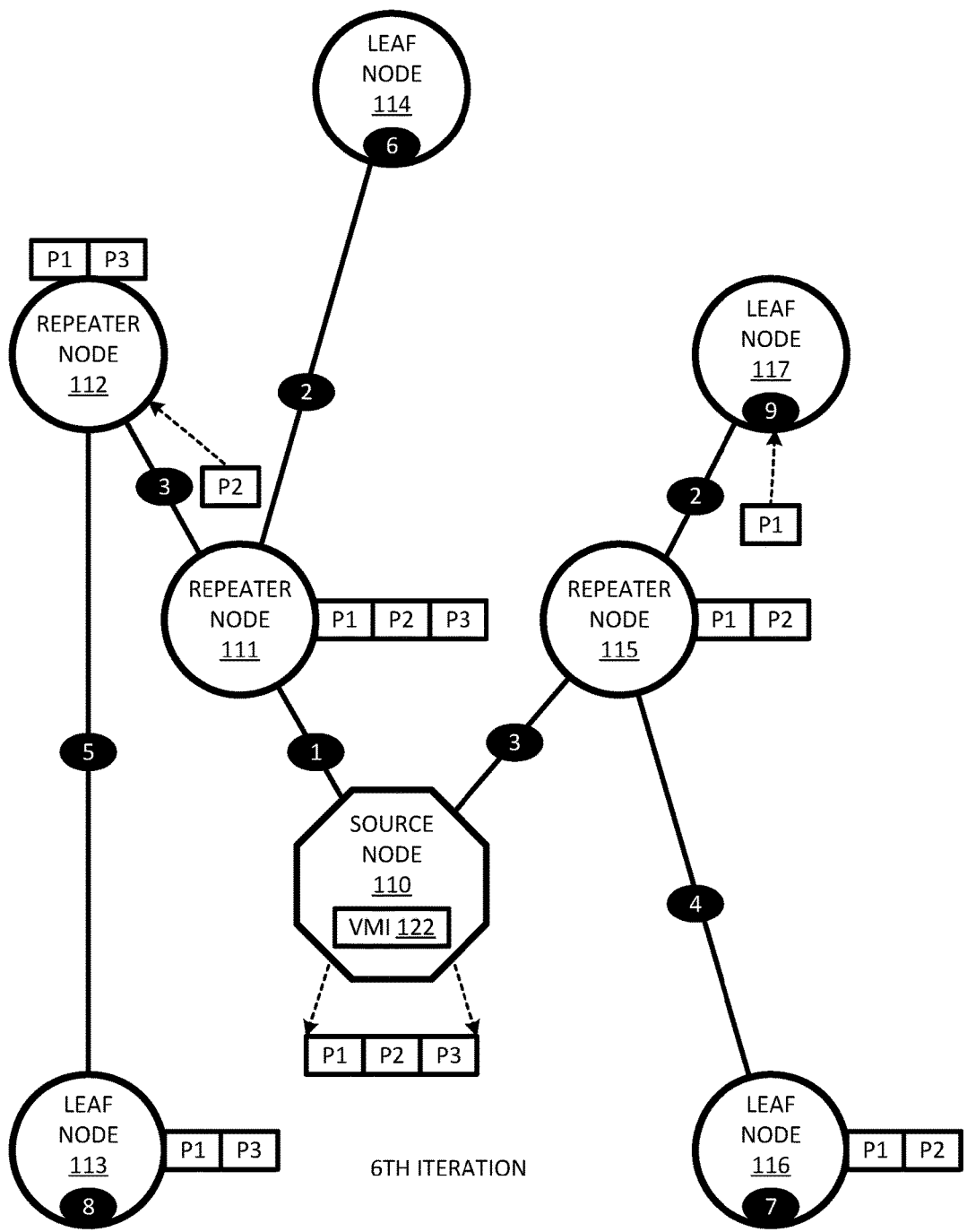

The fifth iteration is described with reference to FIG. 10. Leaf node 113 has the highest cost at 14. It pulls part P2 from repeater node 112 to itself. The result of this transfer will decrease the cost of leaf node 113 by 5 from 14 to 9, which is lower than the cost of next most costly leaf node 116. Leaf node 116 pulls part P1 from repeater node 115, which will decrease the cost of leaf node 116 by 4 from 11 to 7. Since repeater node 115 is tied up transferring part P2 to leaf node 116, leaf node 117 cannot pull any content parts. However, leaf node 113 can still pull part P2 from source node 110 to repeater node 111. This transfer will further decrease the cost of leaf node 113 to 8. These results are shown in FIG. 11. In an embodiment in which a leaf node can pull at most one part per iteration, leaf node 114 can do the pulling of part P2 to repeater node 111.

Figure 12:
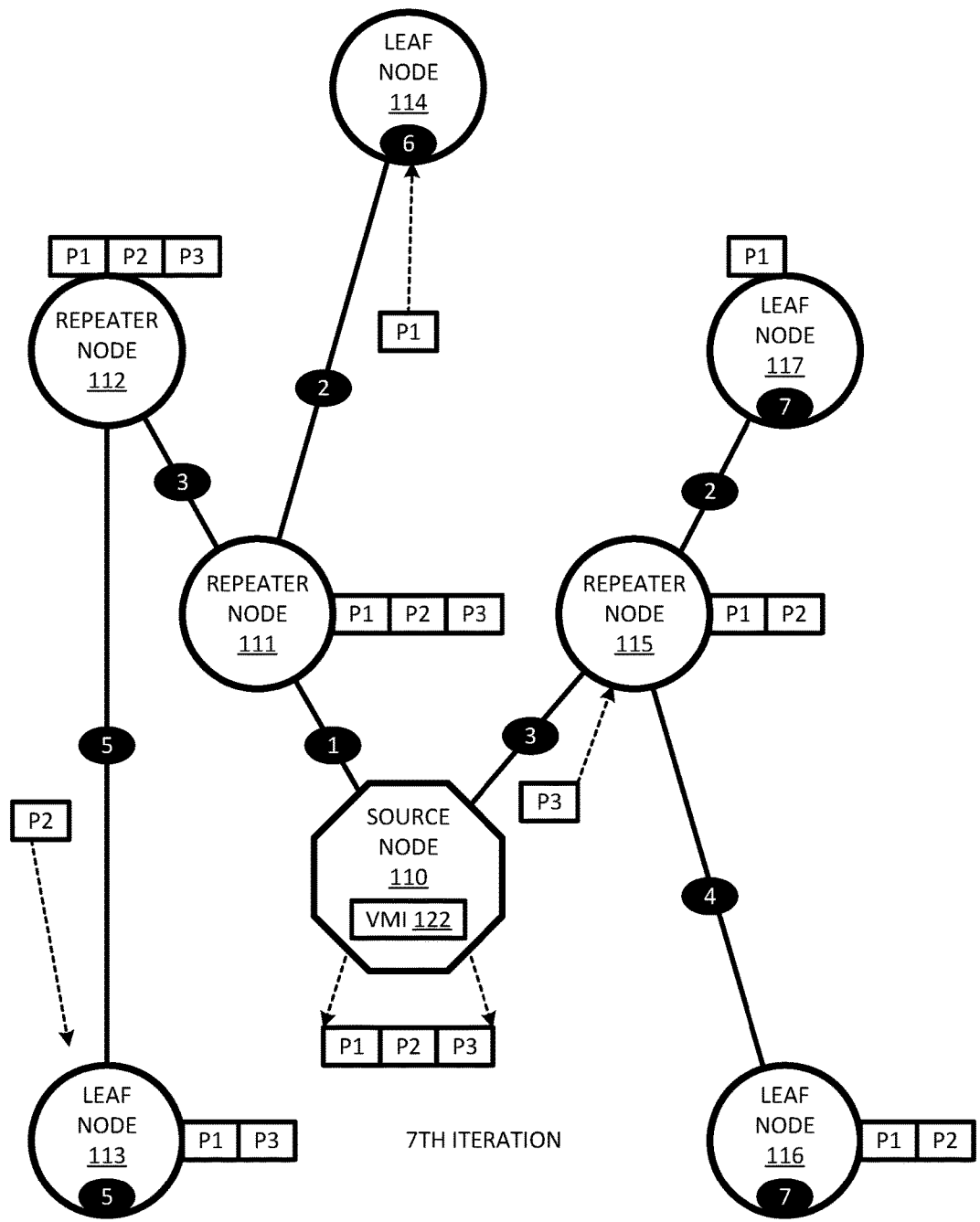

The sixth iteration of content transfer 230 is described with reference to FIG. 11. Leaf node 117 now has the highest cost of 9, so it pulls part P1 from repeater node 115 to itself. This transfer decreases the cost of leaf node 117 by 2 to 7. The second highest cost leaf node is leaf node 113, which pulls part P3 from repeater node 111 to repeater node 112; this decreases the cost of leaf node by 3 from 8 to 5. All other moves are blocked as necessary nodes are involved in the above two transfers. The results are shown in FIG. 12.

Figure 13:
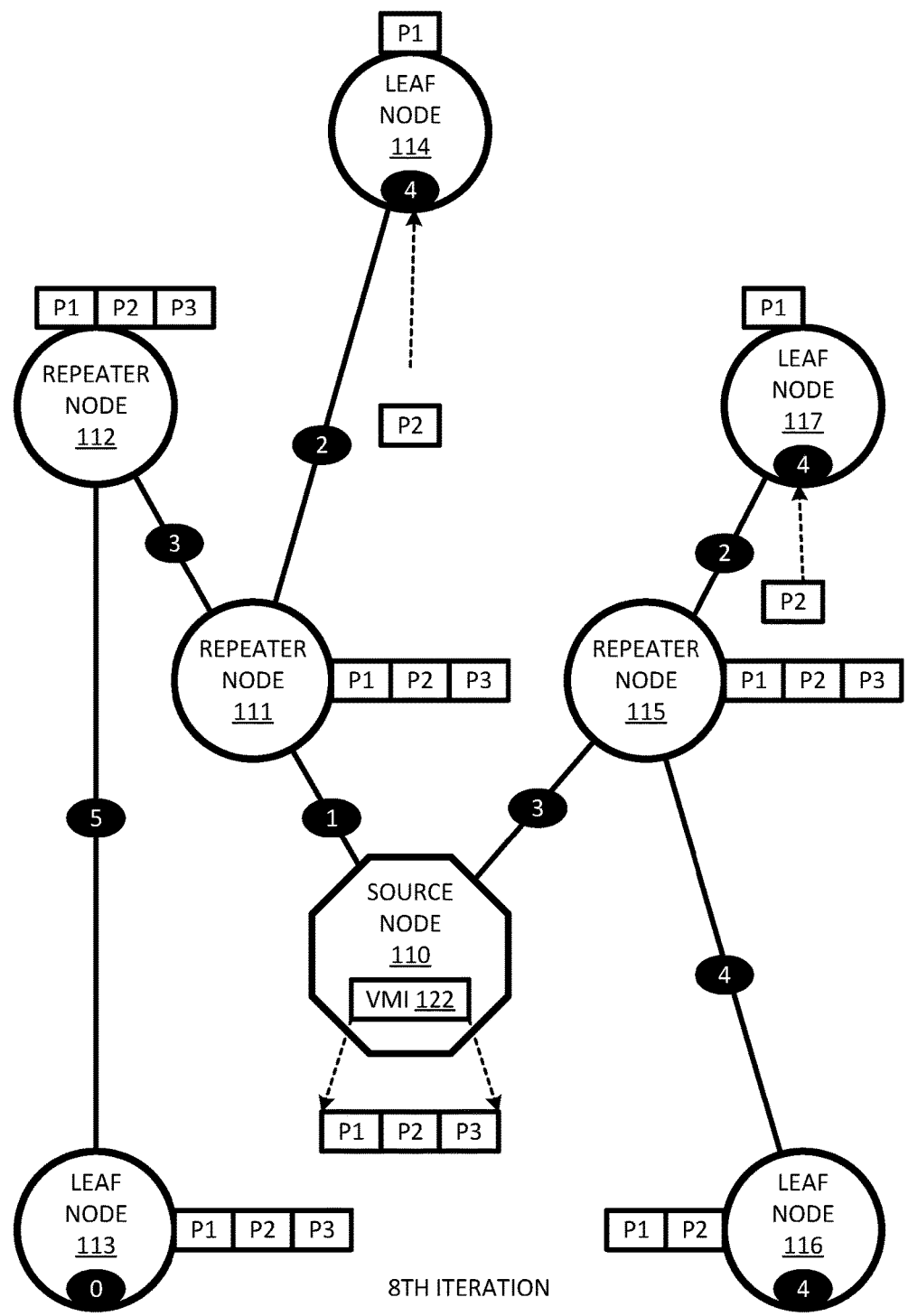

The seventh iteration is described with reference to FIG. 12. Leaf nodes 116 and 117 are tied at 7 for highest cost. Arbitrarily picking leaf node 116 as the highest cost to break the tie, it can pull part P3 from source node 110 to repeater node 115. This reduces the cost of leaf node 116 by 3 from 7 to 4; the cost of leaf node 117 is also reduced by 3 from 7 to 4. Leaf node 117 cannot pull any parts since repeater node 115 is occupied by the part that leaf node 116 is pulling. The next highest cost leaf node is leaf node 114 at 6. It can pull part P1 from repeater node 111 to itself, decreasing its cost by 2 from 6 to 4. Despite its relative low cost during the seventh iteration, leaf node 113 can pull part P2 from repeater node 112 to itself to reduce its cost from 5 to zero. Thus, the transfer of VMI file 112 to leaf node 113 and intermediate repeater nodes 111 and 112 is complete. These results are shown in FIG. 13.

Figure 14:
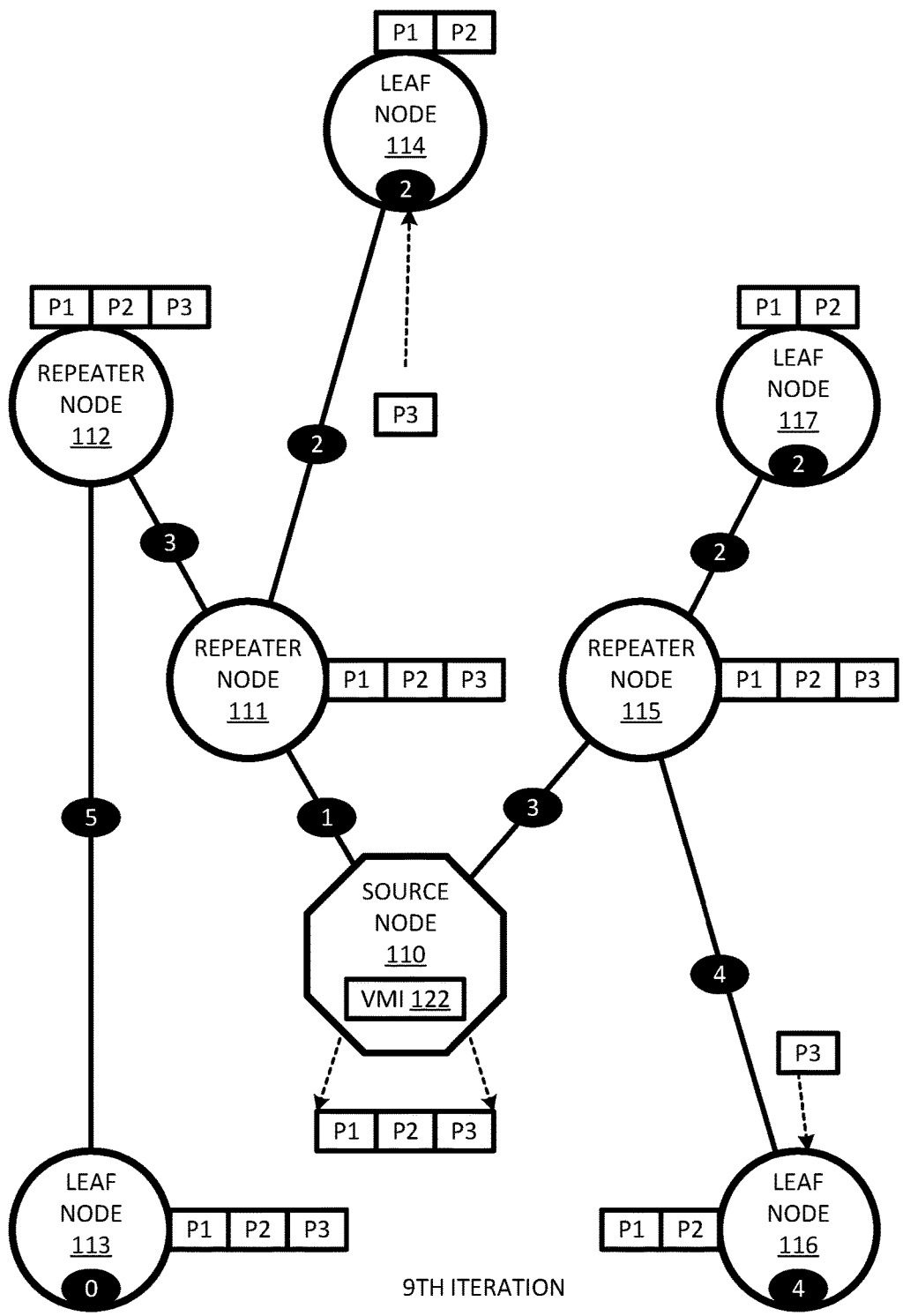

The eighth iteration is described with reference to FIG. 13. Leaf nodes 114, 116, and 117, are tied for highest cost. Depending on the embodiment, selecting among tied leaf nodes can be arbitrary, or can favor the one closest to completion or the one farthest from completion, or be based on traffic considerations. In the illustrated case, leaf node 114 is selected, so it pulls part P2 from repeater node 111 to itself, reducing its cost by 2 from 4 to 2. Then leaf node 117 is selected, so it pulls part P2 from repeater node 115 to itself, decreasing its cost by 2 from 4 to 2. No other moves are available, so once the scheduled transfers are finished, the eighth iteration is complete. The results are shown in FIG. 14.

The ninth iteration is described with reference to FIG. 14. Leaf node 116 has the highest cost at 4, sit it pulls part P3 from repeater node 116 to itself. Upon completion, this transfer reduces the cost of leaf node 116 by 4 from 4 to zero; this means that leaf node 116 has the entire VMI 122. The only other available move is for leaf node 114 to pull part P3 from repeater node 111 to leaf node 114, decreasing the cost of leaf node 114 by 2 from 2 to zero; at this point leaf node 114 has the entire VMI 122. The result of the ninth iteration is represented in FIG. 15.

Figure 15:
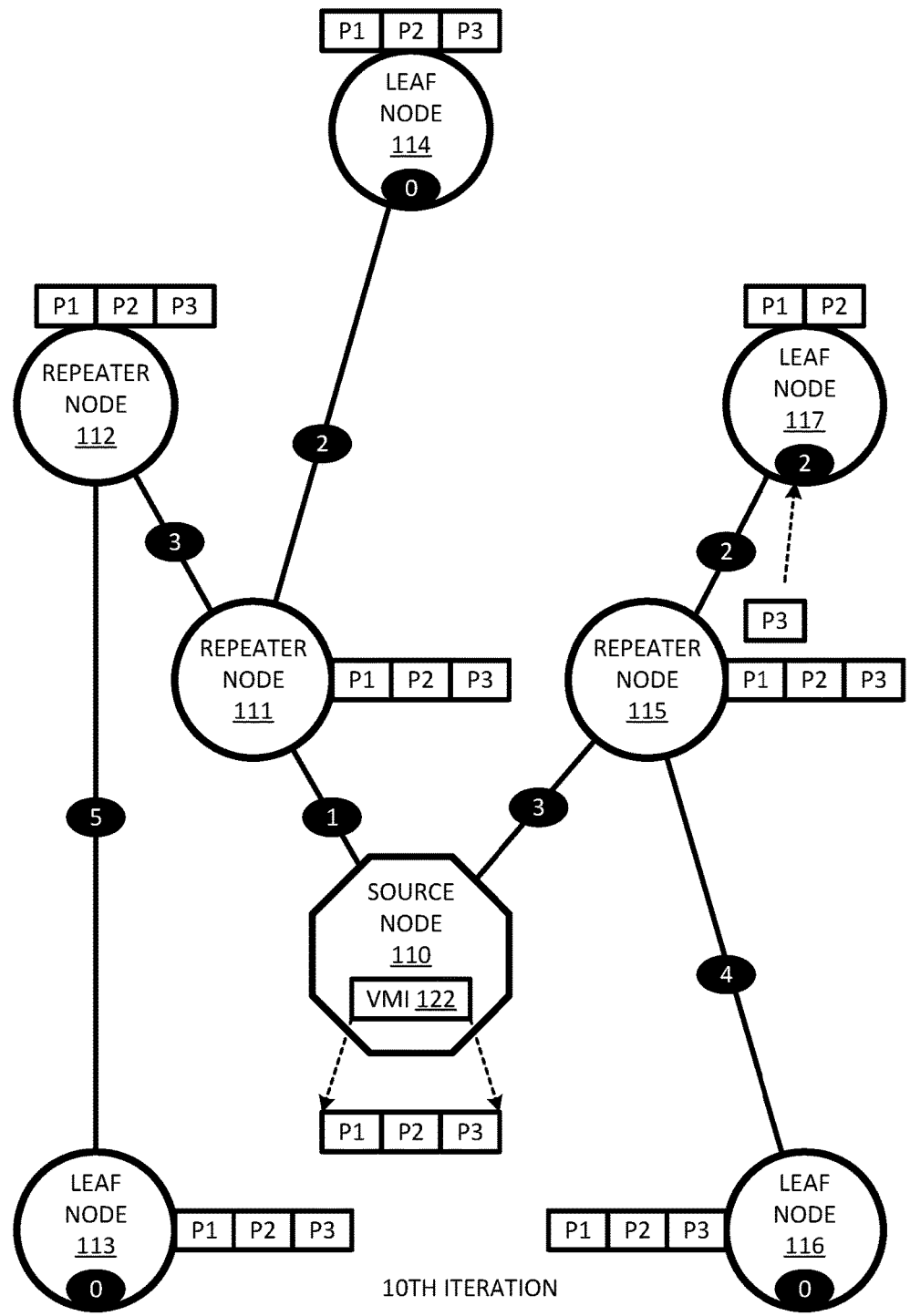
Figure 16:
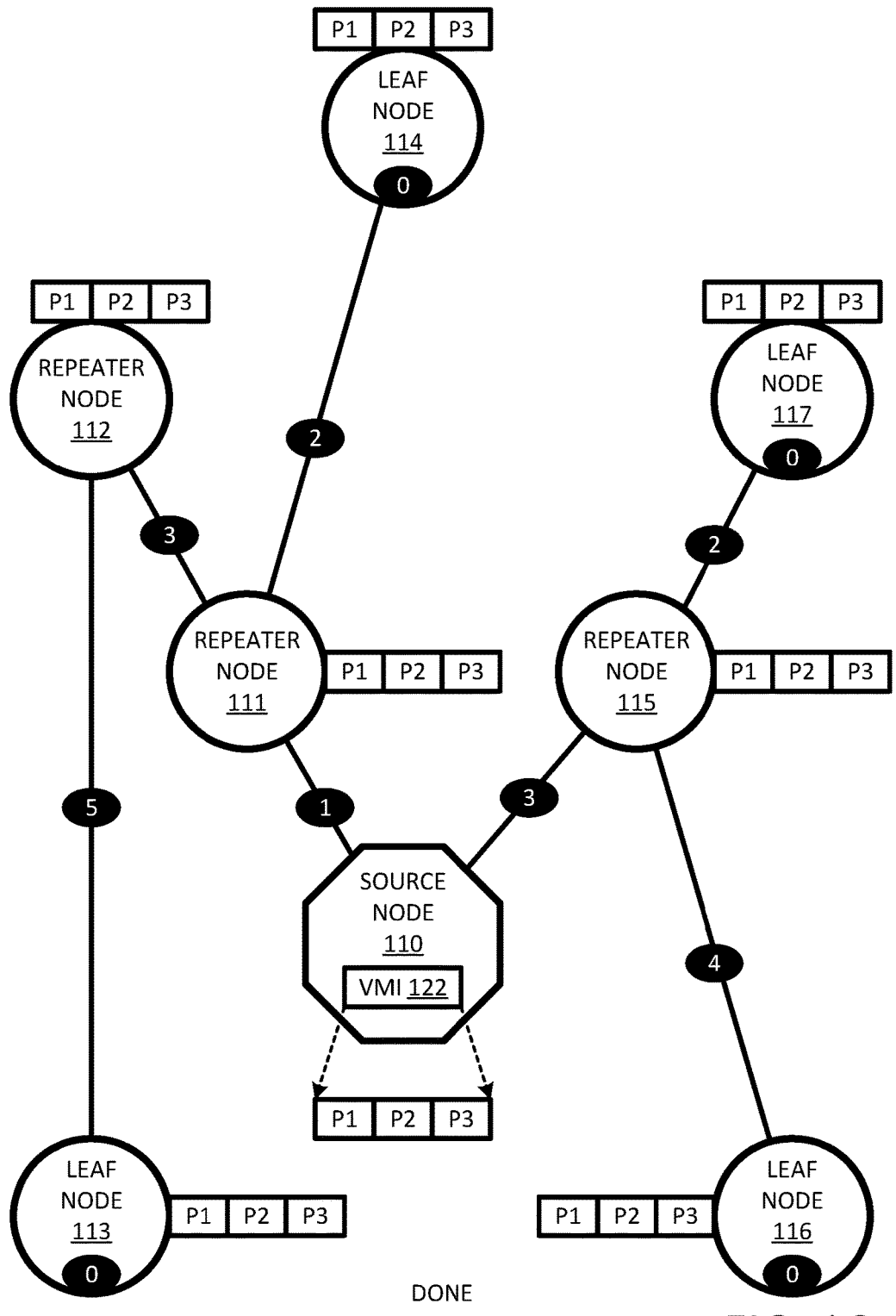

The tenth and final iteration is described with respect to FIG. 15. Leaf node 117 is the only node with a non-zero cost, so it is the highest cost node. As such, it pulls part P3 from repeater node 115 to itself. This reduces the cost of leaf node 117 by 2 from 2 to zero. The result of the tenth iteration is indicated in FIG. 16. All target nodes have all three parts of VMI 122, i.e., the entire VMI 122; thus, content transfer 230 is completed and process 200 is done at 240 (FIG. 2).

As explained above, the invention provides for variations in the way cost ties are handled. One strategy is to move parts that are closest to the source node to reduce traffic congestion in the form of one transfer blocking another transfer. Another strategy is to move parts closest to end nodes or furthest from the source node to all at least some parts to reach end nodes as soon as possible. One overall strategy is to minimize the time required for all target nodes to receive the entire contents.

The invention also provides for variations in whether a leaf node can pull more than one part per iteration. In some embodiments, this is allowed in some it is not allowed. In some embodiments, a second pull in an iteration is allowed provided the cost change to be caused by the first pull would not affect its status as the most costly leaf node. In this vein, one strategy is to just put a leaf node that is pulling a part back in the queue with its cost reduced by the effect on cost of the pulled part determining the priority of the leaf node.

Herein, art labelled "prior art", if any, is admitted prior art, while art not labelled prior art is not admitted prior art. The described invention, as well as variations upon and modifications to the illustrated embodiments are provided for by the invention, the scope of which is defined by the following claims.

What is claimed is:

1. An iterative multicast content distribution process in which a source node of a network is to multicast content divided into a plurality of segments to target nodes of the network via edges of the network, the target nodes including leaf target nodes and repeater target nodes, the leaf target nodes being different from the repeater target nodes, the process comprising:
   assigning edge costs to the leaf target nodes;
   scheduling distribution to the leaf target nodes and to the repeater target nodes based on the edge costs of the leaf target nodes;
   transferring a first segment of the multicast content to a target node based on the scheduling;
   dynamically adjusting the edge costs of the leaf target nodes to reflect changes to a distribution state, the dynamic adjusting including adjusting the edge cost of a leaf target node in response to content being received by a repeater target node; and
   transferring a second segment of the multicast content to a target node based on the adjusting;
   wherein each target node receives content directly from either the source node or a repeater target node, wherein each repeater target node copies received content and sends copied content either to a leaf target node or to another repeater target node;
   wherein an edge cost of a respective leaf target node is correlated with the cost of distributing all segments to the respective leaf target node;
   wherein adjustments to the edge cost of a respective leaf target node are made to make node edge cost correlate with the cost of distributing remaining segments to the respective leaf target node.

2. The multi-cast content distribution process of claim 1 wherein repeater nodes are used to reduce distribution cost to a node.

3. The multi-cast content distribution process of claim 1 wherein a distribution path to a node is established.

4. The multi-cast content distribution process of claim 3 wherein the distribution path is re-established to reflect changes to distribution state or topology.

5. The multi-cast content distribution process of claim 3 wherein the distribution path is based on a graph.

6. The multi-cast content distribution process of claim 5 wherein the distribution cost of the graph may be smaller than connecting a leaf target node directly to the source node.

7. The multi-cast content distribution process of claim 1 wherein transfers toward nodes with higher rank are scheduled before nodes with lower edge costs.

8. The multi-cast content distribution process of claim 1 wherein transfers are scheduled along distribution paths to leaf target nodes.

9. The multi-cast content distribution process of claim 6 wherein the leaf target node is no longer scheduled once it reaches capacity.

10. The multicast content distribution process of claim 6 wherein a plurality of transfers are scheduled along the distribution path in a single iteration.

11. The multi-cast content distribution process of claim 6 wherein transfers further away from the publisher are scheduled before transfers closer to the source node.

12. A system comprising non-transitory media encoded with code that, when executed by a processor, implements an iterative multicast content distribution process in which a source node of a network is to multicast content divided into a plurality of segments to target nodes of the network via edges of the network, the target nodes including leaf target nodes and repeater target nodes, the leaf target nodes being different from the repeater target nodes, the process comprising:
  assigning edge costs to the leaf target nodes;
  scheduling distribution to the leaf target nodes and to the repeater target nodes based on the edge costs of the leaf target nodes;
  transferring a first segment of the multicast content to a target node based on the scheduling;
  dynamically adjusting the edge costs of the leaf target nodes to reflect changes to a distribution state, the dynamic adjusting including adjusting the edge cost of a leaf target node in response to content being received by a repeater target node; and
  transferring a second segment of the multicast content to a target node based on the adjusting;
  wherein each target node receives content directly from either the source node or a repeater target node, wherein each repeater target node copies received content and sends copied content either to a leaf target node or to another repeater target node;
  wherein an edge cost of a respective leaf target node is correlated with the cost of distributing all segments to the respective leaf target node;
  wherein adjustments to the edge cost of a respective leaf target node are made to make node edge cost correlate with the cost of distributing remaining segments to the respective leaf target node.

13. The system of claim 12 wherein repeater nodes are used to reduce distribution cost to a node.

14. The system of claim 12 wherein a distribution path to a node is established.

15. The system of claim 14 wherein the distribution path is re-established to reflect changes to distribution state or topology.

16. The system of claim 14 wherein the distribution path is based on a graph.

17. The system of claim 16 wherein the distribution cost of the graph may be smaller than connecting a leaf target node directly to the source node.

18. The system of claim 12 wherein transfers toward nodes with higher rank are scheduled before nodes with lower edge costs.

19. The system of claim 12 wherein transfers are scheduled along distribution paths to leaf target nodes.

20. The system of claim 17 wherein the leaf target node is no longer scheduled once it reaches capacity.

21. The system of claim 17 wherein a plurality of transfers are scheduled along the distribution path in a single iteration.

* * * * *